May 14, 1940.   A. W. KINGSTON   2,201,097
PHOTOGRAPHIC CAMERA
Filed April 23, 1938   3 Sheets-Sheet 1

Arthur William Kingston
by his attys.
Stebbins Blenko & Parmelee

May 14, 1940. A. W. KINGSTON 2,201,097
PHOTOGRAPHIC CAMERA
Filed April 23, 1938 3 Sheets-Sheet 2
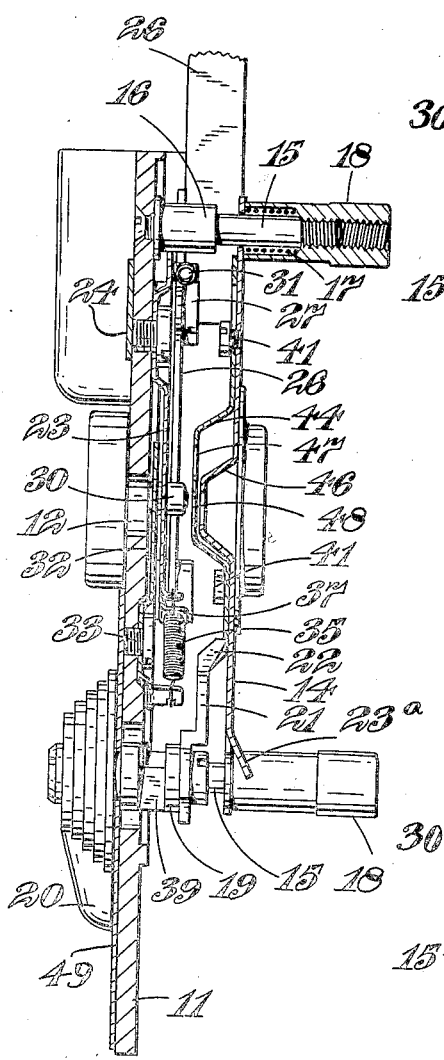

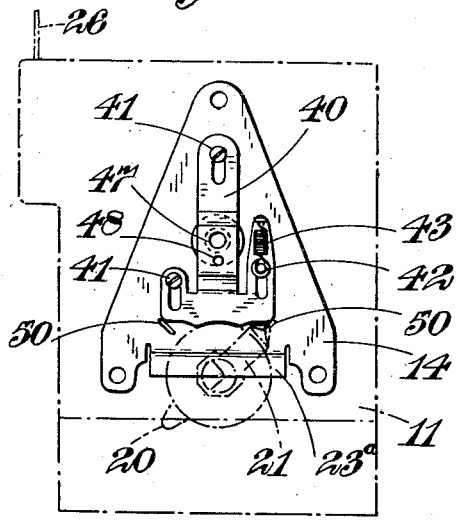
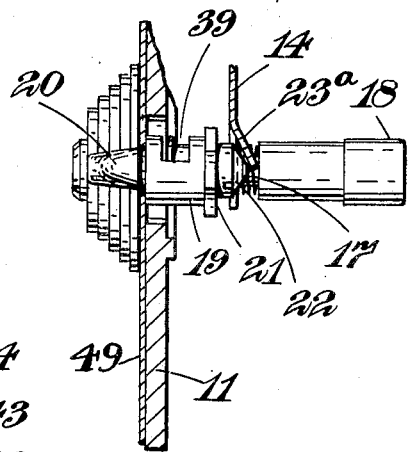
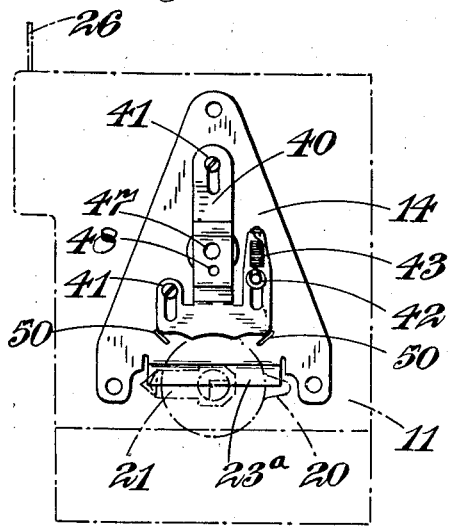

Patented May 14, 1940

2,201,097

UNITED STATES PATENT OFFICE 2,201,097

PHOTOGRAPHIC CAMERA

Arthur William Kingston, London, England, assignor of one-half to Peter Koch De Gooreynd, London, England Application April 23, 1938, Serial No. 203,862
In Great Britain April 13, 1937

4 Claims. (Cl. 95—45)

This application corresponds to the application of Arthur William Kingston, Serial No. 10,519/37, which was filed in Great Britain on April 13, 1937.

This invention is for improvements in or relating to photographic cameras of the kind comprising a plurality of actuating-members each one of which is movable to effect an adjustment of only one of a corresponding number of parts of the camera, for example, the lens, the lens-diaphragm, a filter or the shutter.

According to the present invention, a camera of the kind described is characterised by the provision of a single control-member which is connected to or engages at least two of said movable actuating-members whereby the operation of said actuating-members is effected by means of the single control-member.

According to another feature of the invention, said control-member is constituted by a rotatable shaft which extends through a wall of the camera and has secured thereon an arm or other actuating member, one surface of which is maintained in engagement with a co-operating surface of a lens-carrier and wherein one of said co-operating surfaces is cam-shaped so that oscillation of the arm displaces the lens-carrier.

According to yet another feature of the invention, said control member is constituted by a rotatable shaft which extends through a wall of the camera and has secured thereon an arm or other actuating member which is adapted to be brought into engagement with a co-operating member secured to, or formed integrally with, a diaphragm member having an aperture formed therein and wherein one of said co-operating members is cam-shaped so that oscillation of the arm causes movement of the diaphragm member.

According to yet another feature of the invention said control-member is constituted by a rotatable shaft which has a radially-projecting member secured thereto or formed integrally therewith so that, on rotation of the shaft, the projecting member can be brought into the path of a movable shutter-member to stop the movement of the shutter-member. Preferably the shutter-member is constituted by a plate having an aperture formed therein, which plate is pivotally mounted on the camera so that the aperture can be brought into register with the lens.

According to yet another feature of the invention, the rotatable shaft is formed with one or more grooves along which the shutter-member can pass freely, and is formed with a part which, on rotation of the shaft, is brought into the path of the shutter.

According to a still further feature of the invention, the co-operating member is pivotally mounted and pivotally connected to the diaphragm-member. Preferably, the co-operating member has provision for limited sliding movement with respect to one of its pivotal mountings.

A specific embodiment of the present invention will now be described, by way of example, with reference to the accompanying drawings, in which:

Figure 5 is a section taken on the line 5—5 of Figure 1;

Figures 6 and 7 are views similar to Figure 3 but showing the moving parts in different positions;

Figures 8 and 9 are views similar to Figure 4, but showing the moving parts in different positions, and Figure 10 shows the lower part of Figure 5 with the moving parts in a different position.

Figure 1:
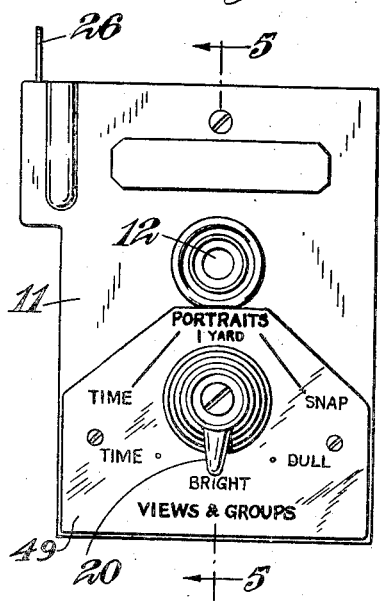
Figure 1 is a front elevation of a camera according to the present invention.
Figure 2:
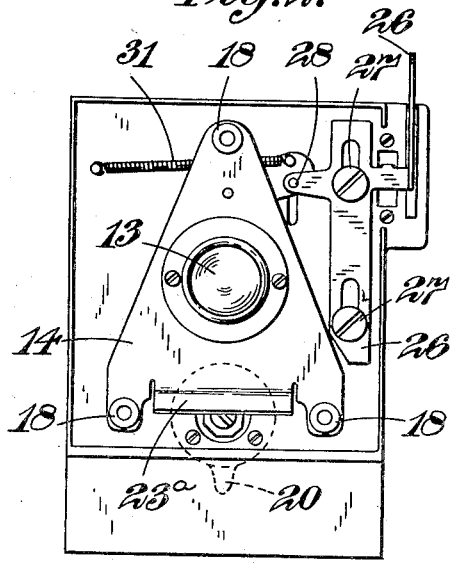
Figure 2 is an elevation of the back of the front wall of the camera.

As shown in the drawings, a box-camera comprises a moulded front wall 11 of synthetic resinous material having formed therein an aperture 12 which is adapted to co-operate with a lens 13. The lens is mounted on a lens-carrier which is constituted by a substantially triangular plate 14 which is supported at each corner on a rearwardly projecting pin 15 secured to the front wall. A shoulder 16 is provided at the front end of each pin and a coil spring 17 which is mounted on each pin 15 between the plate and a nut 18 tends to press the plate into engagement with the shoulder. The nuts 18 are counter-sunk so that when the plate is pressed rearwardly, as shown in Figure 5, the springs are pressed into the recesses formed in the nuts, so that the plate abuts against the upstanding portions of the nuts. The pins are arranged so that when the corners of the plate abut against either the shoulders 16 or the nuts 18, the plate is parallel to the film.

The position of the shoulders 16 is selected so that when the lens-carrier is pressed against them the lens is in the correct position for taking portraits and when the lens-carrier is pressed rearwardly into engagement with the nuts 18 the lens is in the correct position for use when photographing general views.

A shaft 19 is rotatably mounted in the front wall of the camera below the aperture 12 and has a pointer 20 secured at its front end by which it can be rotated. The shaft projects rearwardly beyond the inner face of the wall 11 and has a radially-projecting arm 21 secured at its inner end.

The outer end of the arm 21 is provided with a rearwardly projecting tongue 22 which is of such length that it engages the lens-carrier and presses it rearwardly into engagement with the nuts. The portion of the lens-carrier which is adjacent the horizontal bottom edge, is bent to form a rearwardly-sloping flange 23a and it will be seen that when the arm is rotated by means of the pointer 20 to the position shown in Figure 10, the tongue 22 is brought on to the flange 23a and the lens-carrier is pressed forwardly by means of the springs 17 until it engages the shoulders 16 on the pins. The tongue and flange co-operate to constitute a face-cam by means of which the position of the lens can be selected.

Figure 3:
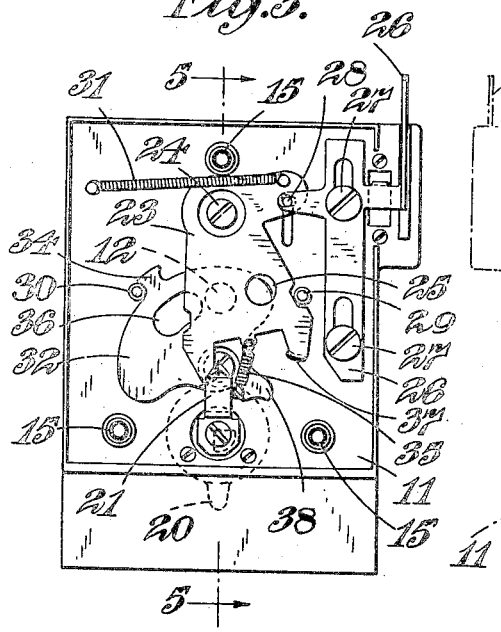
Figure 3 is a view similar to Figure 2 with the lens-carrier removed.
Figure 4:
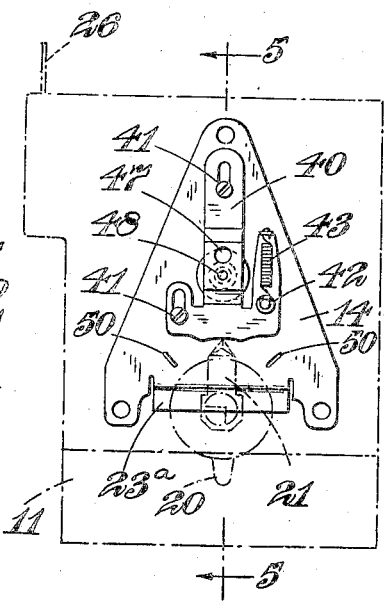
Figure 4 is a front view of the lens-carrier.

The shutter of the camera (Figures 3, 6 and 7) comprises a plate 23 pivotally mounted at 24 on the wall 11, which plate is formed with an aperture 25 adapted to register with the aperture 12 in the front wall. An operating trigger 26 which is slidably secured on the wall 11 by screws 27, is pivotally secured to the plate 23 by a pin 28, and stops 29 and 30 are provided on the back of the wall 11 to limit the pivotal movement of the plate 23, the stop 30 being so disposed that when the plate abuts against it, the aperture 25 is in register with the aperture 12. A return spring 31 is provided to maintain the plate 23 in the inoperative position abutting against the stop 29 and also to keep the trigger 26 in the inoperative position.

The shutter also comprises a second plate 32 which is operated by the plate 23. The plate 32 is pivotally mounted on the wall 11 at the point 33 and is provided with a tongue 34 which abuts against the stops 29 and 30 to limit the movement of the plate. A spring 35 is mounted at one end on the plate 23 and at the other end on the plate 32 and is so disposed thereon that when the plate 23 is in the inoperative position (Figure 3) the tongue 34 on the plate 32 is spring-pressed against the stop 30, but on pressing the trigger 26, just before the plate 23 assumes the operative position (Figure 6) the spring 35 is swung past the pivot point 33 and so tensioned that the tongue 34 is in turn swung into engagement with the stop 29. An aperture 36 formed in the plate 32 registers temporarily with the apertures 12 and 25 as the plate swings across and thus provides a short exposure. On releasing the trigger 26 the spring 31 returns the plate 23 to the inoperative position and just before this is assumed the spring 35 again reaches a point past the pivot point 33 and returns the plate 32 to the position shown in Figure 3. Rearwardly extending tongues 37 are provided on the plate 23 which engage the spring 35 to ensure that it passes the point 33.

In order to provide a time exposure, an arm 38 (Figure 7) is formed on the plate 32 and is of such length that it abuts against the shaft 19 and stops the movement of the plate when the aperture 26 registers with the apertures 12 and 25 to make an exposure. For instantaneous exposures, a groove 39 is formed in the shaft 19 so that the arm 38 can pass freely along it when the shaft has been rotated to a position with the groove 39 uppermost. The choice of a time or instantaneous exposure can therefore be selected by the pointer 20 which also selects the point of focus.

The arm 21 and tongue 22 which operate the lens-carrier 14 are also used to bring a diaphragm in front of the lens to reduce the effective aperture. As shown in Figures 4, 5, 8 and 9, a plate 40 is secured on the front of the plate 15 by screws 41 and a pin 42 so that it can slide vertically relatively to the plate. A spring 43 secured at the lower end on the pin 42 and at the upper end on the plate 40 presses the plate downwardly so that a part 44 engages a flat formed on a lens-hood 46 which is formed integrally with the plate 14. An aperture 47 is formed in the plate at such a position that when the plate is pressed down by the spring 43 it registers with the lens 13, this aperture is of suitable size for making exposures when the light is dull. A second smaller aperture 48 for use in bright light, is formed in the plate 40 below the aperture 47 and this can be brought into register with the lens by sliding the plate upwardly against the pressure of the spring 43.

The upward movement of the plate 40 is caused by rotating the arm 19 so that the tongue 22 engages the bottom edge of the plate 40. The bottom edge is cam-shaped and as the co-operating tongue 22 is swung across from the position shown in Figure 8 to that shown in Figure 4, the plate 40 is forced upwardly against the spring pressure until the smaller aperture 48 is in the operative position; further movement of the tongue in the same direction permits the plate to return to the normal position with the larger aperture in the operative position.

It will be seen that the operation of the shutter, focussing and the selection of a suitable aperture are all controlled by the pointer 20 on the shaft 19.

As shown in Figures 1 and 5, a plate 49 is mounted on the face of the camera to show the correct position of the pointer for the various settings and detents 50 are provided in the plate 14 to locate the tongue 22 in corresponding positions. The position of the tongue 22 is visually indicated by the position of the pointer 20 with respect to the plate 49. When "Portrait-snap" is selected, the arm 38 is permitted an uninterrupted passage through the upturned groove 39 in the shaft 19, the lens-carrier is pressed into the forward position because the tongue 22 engages the flange 23a (Figure 10) and the large aperture 47 is retained in the operative position by the spring 43. It will be seen that on pressing the trigger 26, an instantaneous portrait exposure is made with the large aperture. On moving the pointer round to "Views-dull" (Figure 9) the tongue 22 rides up on to the plate 14 and presses it rearwardly into the correct position for photographing general views, but the diaphragm and shutter setting are unaltered. Further movement of the pointer to the position "Views-bright" (Figures 1–6) only alters the diaphragm setting by bringing the tongue 22 into engagement with the plate 40 so as to bring the smaller aperture into the operative position. On moving the pointer to "Views-time" the large aperture is again brought into position and the shaft 19 is so rotated that the groove is no longer uppermost so that the shutter plate 32, as above described, abuts against the uncut portion of the shaft 19 to provide a time exposure. On moving the pointer to the final position "Time-portraits" the diaphragm and shutter setting are unaltered, but the tongue 22 is again brought on to the flange 23a so that the lens-carrier 14 is moved forward to the portrait position.

The lens of the camera or both the said lens and its mount may be moulded from transparent plastic material as disclosed in the specification of British Letters Patent No. 416,398.

I claim:

1. A camera comprising an adjustable lens-carrier, a diaphragm-member having a plurality of apertures mounted on the lens-carrier and movable relatively thereto, a movable shutter member, a single control-member for effecting adjustment of the lens-carrier and the diaphragm-member comprising a rotatable shaft, an arm mounted on the shaft and having formed thereon one surface adapted to engage a co-operating surface on the lens-carrier and a second surface adapted to engage a co-operating surface on the diaphragm-member, which co-operating surfaces constitute cams so that rotation of the shaft effects movement of the lens-carrier and diaphragm-member, said shaft also having means thereon for controlling the time operation of the shutter member, the arrangement being such that upon rotation of the shaft there is provided for each shutter speed at least two settings of the aperture and the lens carrier.

2. A camera comprising an adjustable lens-carrier, a diaphragm member having a plurality of apertures and movable relatively to the lens carrier, a movable shutter member, a single control member for effecting adjustment of the lens-carrier and the diaphragm member comprising a rotatable shaft, an arm mounted on the shaft and having formed thereon one surface adapted to engage a cooperating surface on the lens-carrier and a second surface adapted to engage a cooperating surface on the diaphragm member, the cooperating surfaces constituting cams so that rotation of the shaft effects movement of the lens-carrier and diaphragm member, said shaft also having means thereon for controlling the time operation of the shutter, the arrangement being such that upon rotation of the shaft there is provided for each shutter speed at least two settings of the diaphragm member and the lens-carrier.

3. In a camera having a wall, an aperture in the wall, a movable lens-carrier movable towards and away from the wall, a lens mounted on said lens carrier, a diaphragm aperture member having a plurality of apertures and movable relative to the lens-carrier, a plurality of cam surfaces on the diaphragm aperture member, a shutter member, a rotatable shaft which extends through the wall of the camera, an arm mounted on the shaft and having thereon one surface adapted to engage the cam surfaces on the diaphragm member and a second surface adapted to engage a co-operating surface of the lens-carrier to provide a cam action whereby oscillation of the shaft will displace the lens-carrier towards or away from the aperture and move the diaphragm member so that a desired aperture is in register with the lens, a portion of the shaft being shaped so as to engage a portion of the shutter member to control the operation of the shutter member, the arrangement being such as to provide for each shutter speed at least two settings of the diaphragm aperture member and the lens-carrier.

4. In a camera having a wall, a lens, a movable lens-carrier movable toward and away from the wall, a lens diaphragm having a plurality of openings registrable with the lens and movable relative to the lens carrier, a movable shutter adjustable for time and instantaneous exposures, means for actuating said shutter, a rotatable shaft journaled in said wall, means on said shaft engageable with a cooperating surface on the lens-carrier to provide a cam action so that oscillation of the shaft will urge the lens-carrier in one direction, spring means for urging the lens-carrier in the opposite direction, means on the shaft engageable with a cooperating surface on the lens diaphragm to move the lens diaphragm relative to the lens-carrier upon oscillation of the shaft, said shaft having an eccentric portion which on oscillation of the shaft can be brought into the path of the shutter member to arrest the movement thereof, said shutter member comprising a plate having an aperture therein, which plate is pivotally mounted on the camera so that the aperture can be brought into register with the lens, the arrangement being such that at least two settings of the diaphragm and the lens carrier are provided by appropriate oscillation of the shaft for each selective setting of the shutter.

ARTHUR WILLIAM KINGSTON.